INVENTORS
EDGAR H. FRITZE
HORST M. SCHWEIGHOFER
BY Marie Moody
ATTORNEY

United States Patent Office 2,943,482
Patented July 5, 1960

2,943,482

FLIGHT DIRECTOR AIRCRAFT INSTRUMENT

Edgar H. Fritze and Horst M. Schweighofer, Cedar Rapids, Iowa, assignors to Collins Radio Company, Cedar Rapids, Iowa, a corporation of Iowa Filed Oct. 23, 1956, Ser. No. 617,756

2 Claims. (Cl. 73—178)

This invention is related in general to aircraft guidance and more particularly to an aircraft instrument for display of basic aircraft attitude together with relatively positioned glide slope and flight director steering indications.

A feature of this invention is the superposition of flight director steering information over that of basic attitude information.

It is an object of this invention to combine such attitude and position data in a logical and unambiguous manner so as to present a pictorial indication of a given flight situation on a single instrument in the manner of a "forward view." The presentation of the flight situation is such that the pilot is provided with additional valuable cues by the interpretation of the various indicia on the instrument.

A further object of this invention is to provide an instrument whose indications present pitch and bank "command" indications to the pilot.

Further features and objects of this invention will become evident from the following description and claims when read in conjunction with the drawings, in which:

Figure 1:
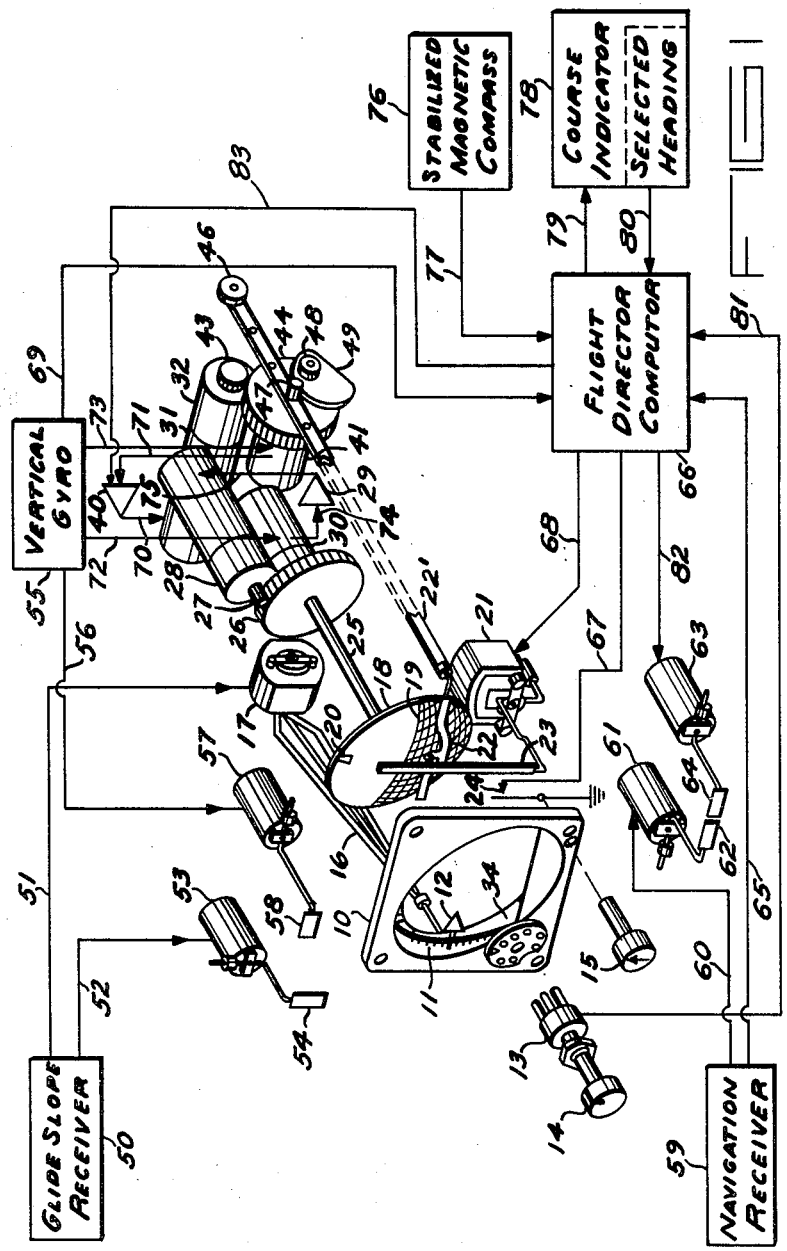
Figure 1 is a mechanical diagram of the flight director horizon instrument together with a functional representation of the signal sources for operation of the various indicia.
Figure 2:
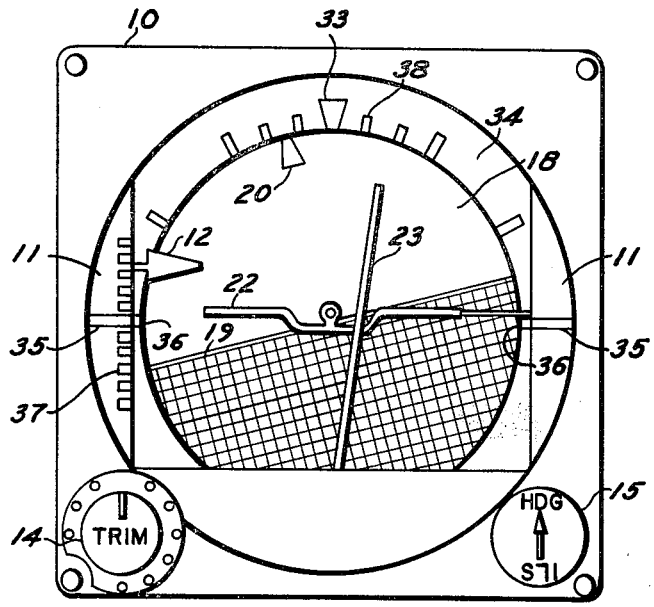
Figure 2 is a front plan view of the assembled instrument.

As shown in Figure 1, a front supporting member 10 is provided with a circular window through which the flight situation is pictorially presented. A mask member 34 is affixed to the rear of the supporting member 10. A horizon disk 18 is supported so as to be concentrically within the opening in mask 34. Horizon disk 18 is stabilized against roll through a servo tie-in with an external vertical gyro 55. The electromechanical aspects of this servo tie-in will be further discussed in detail. Horizon disk 18 has fixed thereon a horizon bar 19 which diametrically bisects the face of the disk. Also located on the periphery of the horizon disk is a second index mark 20 which is positioned on the periphery at a point which lies on a perpendicular diameter to horizon bar 19. The mask 34 is provided with a plurality of index marks (best seen in Figure 2). A center mark 33 serves as a zero reference with index 20 to indicate bank attitude. On either side of center reference mark 33 is provided a plurality of equally spaced marks 38, which marks indicate degrees of aircraft roll from the vertical position. The degree of roll is thus indicated by the fixed reference mark 38 opposite index mark 20 on horizon disk 18.

With reference to Figure 1, a glide-slope pointer 12 is positioned for vertical movement by means of a glide slope meter movement 17. Pointer 12 is attached at right angles to a pointer arm 16 so that pointer 12 describes an arc in its vertical movement defined by the radius of arm 16. A vertical opening (not shown in the figures) in mask 34 allows access for the vertical movement of arm 16 relative thereto. A second mask member 11 is attached forward of mask 34 and behind front face 10 so as to form a reference for the vertical movement of pointer 12. Mask 11 is provided with a plurality of reference marks 35 and 37 (see Figure 2). Reference mark 35 serves as the zero reference. Mask 11 is formed into an arc of similar radius to that of pointer 12, such that during vertical movement of pointer 12, the pointer is maintained adjacent to the reference marks throughout the range.

Mounted immediately in front of horizon disk 18 is a third indicator 22 in the form of a U-shaped bar. This indicator is positioned vertically in accordance with pitch attitude through a servo tie-in with the vertical gyro 55. This servo tie-in is identical with that of the above-discussed horizon disk 18. The details of this servo tie-in will be further discussed. Pitch bar 22 is affixed to the end of a pivot arm 22' and, in its vertical movement, describes an arc determined by the length of arm 22'. Parallax error is held to a minimum by forming horizon disk 18 as a spherical surface with a radius of curvature equal to that of the arc described by the movement of pitch bar 22. This curvature is very nearly that of the arc described by glide-slope pointer 12, since, in assembled relationship, the proximity of disk 18, pointer 12, and bar 22 permits approximately equal curvatures.

A fourth indicator for this instrument functions as a steering command indicator. As seen in Figure 1, a steering pointer 23 is pivoted from the bottom of the instrument by a flight director steering meter 21. Steering pointer 23 is positioned to pivot in a plane slightly forward of glide-slope pointer 12 and pitch bar 22. Steering pointer 23 is adapted to present roll command or lateral guidance information. The signal provided to flight director steering meter 21 is of the null indication type; a deviation to right or left of center commanding a corresponding right or left increment of bank angle.

The glide-slope meter 17 and the flight director steering meter 21 are D.C., zero-center meter movements which are driven directly from a glide-stop receiver and flight director computer, respectively.

Horizon disk 18 is rigidly affixed to the rotor shaft 25 of a bank synchro 30. Shaft 25 of synchro 30 is positioned by gear 26 which is driven by a gear 27 on the shaft of a bank servo motor-generator 28. The shaft 25 of bank synchro 30 is positioned in accordance with voltages developed in a synchro transmitter which is associated with an external vertical gyro 55. Servo motor 28 thus positions shaft 25 through gears 27 and 26 to a position indicative of the bank attitude of the aircraft.

Pitch bar 22 is controlled from a servo mechanism similar to that of the horizon disk 18. The servo system positions the rotor of a pitch synchro 41 to an angular position indicative of pitch attitude through a synchro link with a transmitting synchro in the vertical gyro. The rotor of pitch synchro 41 is positioned by a pitch servo motor-generator 31 through gears 43 and 44. The angular position of the shaft of pitch synchro 41, being thus indicative of pitch attitude, is transformed from a rotational motion into the desired vertical motion of pitch bar 22. Arm 22' of pitch bar 22 is rotatably supported in a fixed bearing 46. A cam 49 is supported on the outer edge of pitch synchro gear 44 by a clamping means 48. The pitch bar arm 22' is fitted with a cam follower 47. The rotary motion of pitch synchro gear 44 is thereby converted to the desired vertical motion of pitch indicator 22 by the relative positioning between cam 49, gear 44, and cam follower 47. Provisions are thus made to have pitch indications follow a non-linear function in order to provide a desired increase in displacement per degree of pitch angle in the region of plus or minus 10 degrees climb or dive from a level flight condition. This is accomplished by cutting the desired curve on cam 49 so as to affect a smoothly decreasing sensitivity with increasing pitch angle to give a plus or minus 85 degrees pitch indication for approximately plus or minus 1.5 inches total pointer travel.

Figure 3:
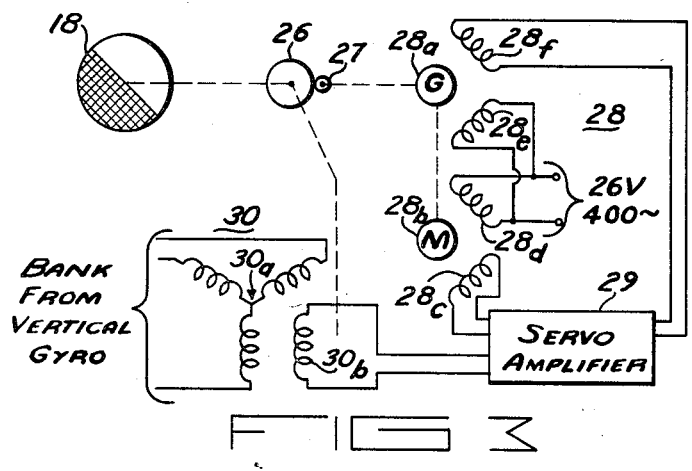
Figure 3 is a schematic of the type of servo loop employed to position the pitch and bank indicators.

The pitch and bank servo loops previously mentioned are identical and are typically illustrated in the schematic representation of Figure 3. References to Figure 3 pertain to the bank servo loop for illustration purposes. As shown in Figure 1, signals indicative of a rotary position are supplied to bank synchro 30 from vertical gyro 55 through connector 72. With reference to Figure 3, the signals are supplied to the synchro stator 30a. Assuming that rotor 30b is not in the same relative angular position as the rotor of the synchro transmitter in the vertical gyro, and error voltage will be induced in rotor 30b which is applied to servo amplifier 29. This connection is indicated by the reference number 74 in Figure 1. Servo amplifier 29 develops an output signal with phase and magnitude determined by the positional error of rotor 30b of the bank synchro. The servo amplifier output is applied to one winding 28c of a two-phase motor-generator 28, the other winding 28d being connected to a reference signal source. The rotor 28b is thus rotated in accordance with the signal error in a well-known manner and, through the mechanical drive, positions the rotor 30b of the bank synchro for a condition of zero error voltage. Degenerative feedback from a generator winding 28f of motor-generator 28 is applied back to servo amplifier 29 in order to attain proper damping of the servo loop. The gear reduction provided from motor 28 to synchro rotor 30b (gears 26 and 27) is chosen to provide the proper transfer constant in the servo loop.

In Figure 1, the described instrument is indicated functionally in conjunction with the external signal sources from which the flight indications are formulated. A glide-slope receiver 50 provides a D.C. deviation voltage through connector 51 to position glide-slope meter 17. An external vertical gyro 55 supplies bank and pitch positioning signals through connectors 72 and 73 to bank synchro 30 and pitch synchro 41, respectively. Vertical gyro 55 also supplies pitch and bank signals through connector 69 to a flight director computer 66. Flight director computer 66 also receives an input through connector 77 from a stabilized magnetic compass 76, an input through connector 80 from a course indicator 78, an input through connector 65 from a navigation receiver 59, an input through connector 81 from a trim control 13 and an input through a connector 67 from a function switch 24. Flight director computer 66 develops from these inputs a composite steering signal which is applied through connector 68 to the flight director steering meter 21. An output 79 from the computer completes the course-heading loop with course indicator 78. Input to the computer from navigation receiver 59 consists of a signal indicative of omnirange bearing which is combined in the computer with stabilized magnetic compass and heading signals to form a composite command steering signal for flight director steering meter 21.

The pitch-trim signal applied to the computer through connector 81 is introduced by the trim-control 13 through rotation of knob 14 such that pitch bar 22 might be adjusted according to the trim of the particular aircraft. Pitch trim might then be electrically conveyed in the form of a bias signal from computer 66 through connector 83 to pitch servo amplifier 40. The input to the flight computer from connector 67 is seen to be a ground connection which is selected by positioning control knob 15 to open or close switch 24. This ground connection initiates switching within flight director computer 66 such that different modes of operation may be put into effect; thus the two positions of switch 24 might for example, correspond to a heading mode and an ILS mode. These two operational modes are well known in the art. For example, the heading mode might select computer inputs to develop steering signals from relative heading and bank angle while the ILS mode might select computer inputs corresponding to displacement and the first and second derivatives thereof taken from lateral deviation, relative derived heading with respect thereto, and bank angle, respectively.

The pictorial indication made possible by the above-discussed indicia may be summarized as follows:

Pitch attitude is indicated by the vertical position of pitch bar 22 with respect to horizon bar 19 and/or indicia 35 and 36.

Roll attitude is indicated by the relative angular position of horizon bar 19 with respect to the pitch bar 22 and/or horizontal indices 35 and 36 at either side of the instrument face.

Bank angle is indicated by the relative position of the bank index 20 with respect to the reference marks 33 and 38.

Pitch command or director information is presented by the relative position of glide-slope pointer 12 with respect to pitch bar 22. The glide-slope pointer 12 shows displacement (only) of the glide slope with respect to the airplane (index mark 35).

The interrelationship of the indicators on this instrument make it possible to provide the pilot with valuable sensory cues for positioning and guiding the aircraft.

Horizontal guidance by means of the steering pointer is attained from the development of a steering pointer signal which is the summation of several signals whose sources originate with basic attitude, azimuth, and positional sensors. The steering pointer receives its power from the flight director computer. This signal is made up of the algebraic summation of bank command and bank angle signals. The pilot, in controlling the airplane to keep the steering pointer centered, is essentially following a bank error signal. In other words, the degree of deflection of the steering pointer is a measure of how far and in what direction the pilot should roll the aircraft to make good his course. This pointer is, therefore, logically pivoted at the bottom of the instrument so as to command a rolling movement pictorially.

The instrument, with respect to vertical guidance, is designed to present both vertical position (with respect to glide slope) and pitch separately, but in such a manner that accurate flight director proportional control of pitch can be easily attained by visual combination of these signals to make good the desired flight path during a landing operation. This system is preferable to systems wherein these signals are combined electrically and only their resultant is presented to the pilot on a null-type vertical guidance indicator. The present instrument provides the pilot with a steering command, while always informing him of the magnitude and sense of the error he is correcting. This becomes an obvious preferred steering indication when, for example, touchdown is imminent and a knowledge of vertical location is valuable in addition to a command steering indication which can only inform the pilot by zeroing certain indicia that he is doing the right thing to make good his approach.

Thus when the glide-slope pointer indicates, for example, that the aircraft is below the glide slope (glide-slope pointer above center position), a "pitch-up" correction to where the pitch bar becomes adjacent or "matches" the glide-slope pointer will bring the aircraft asymptotically back toward the glide slope. By showing actual position with respect to the glide slope at all times, any standoff error due to excessive head or tail wind components or to unusual trim conditions will be apparent immediately, and the pilot can easily introduce the slight amount of over-correction required on pitch to "wash out" such a standoff error and, thus, make good an accurate glide-slope approach. Further, by presenting both pitch and bank attitude indications on one instrument, the transition from glide slope and steering attention during the early part of the approach to that of attitude attention at the lower altitudes is greatly facilitated.

Since the flight picture thus presented is formulated from glide-slope receiver, navigation receiver, vertical gyro, and flight director computer signal sources, alarm flags are provided which are visible on the front face of the instrument should signals from the above sources fail or become undependable. With reference to Figure 1, during normal operation, a glide-slope flag meter movement 53 is energized through connector 52 from glide-slope receiver 50 to displace flag 54 such that it is out of sight when viewing the instrument face. A signal output 56 from vertical gyro 55 likewise energizes a gyro meter movement 57 to hold flag 58 out of view. A navigation receiver flag 62 is positioned by a third flag meter movement 61 through connection 60 with navigation receiver 59. Finally, computer operation is monitored by a fourth flag 64 controlled by a flag meter movement 63 through a connection 82 with flight director computer 66.

Although this invention has been described with respect to a particular embodiment thereof, it is not to be so limited as changes and modifications may be made therein which are within the full intended scope of the invention as defined by the appended claims.

What is claimed is:

1. A flight director horizon indicator for an aircraft comprising a front supporting member formed with a circular opening therein, a horizon indicating disk member rotatably mounted with respect to the axis of said circular opening and concentrically mounted within said opening, a horizon indicating bar diametrically bisecting said disk and a bank reference mark positioned on the periphery of the disk on a perpendicular diameter to said horizon bar, a plurality of fixed reference marks, said fixed reference marks cooperating with said bank reference mark to indicate degree of bank, a pitch indicator bar mounted in front of said disk member, further fixed reference marks cooperating with said pitch indicator bar to indicate degree of pitch and including a zero pitch indicating reference mark, said bar adapted for vertical displacement above and below said zero pitch indicating reference mark to indicate pitch up and pitch down attitudes respectively, said bar having one free end and one end connected at right angles to a first pivot arm, a glide-slope pointer fixed at right angles to a second pivot arm, said pointer being adapted for vertical displacement above and below said zero pitch indicating reference mark in response to corresponding glide-slope position with respect to said aircraft, the extremity of said pointer describing a vertical path adjacent to that described by the free end of said pitch indicator bar, a steering indicator needle, said needle mounted in front of said horizon bar and glide-slope pointer and pivoted about an axis perpendicular to and at the bottom of said front supporting member, activating means responsive to signals indicative of roll attitude connected to said horizon disk to rotate said disk about its axis, activating means responsive to glide-slope displacement connected to said glide-slope pointer, activating means responsive to pitch attitude connected to displace said pitch bar, and activating means responsive to steering command signals connected to displace said steering pointer.

2. A flight director horizon indicator for an aircraft comprising a front supporting member formed with a circular opening therein, a first masking member affixed to the rear of said supporting member, said first masking member formed with a circular opening therein, a horizon indicating disk member mounted concentrically within said opening in the first masking member and rotatably mounted about a fixed axis with respect to said opening, a horizon indicating bar diametrically bisecting said disk member and a bank reference mark placed on the periphery of the disk on a perpendicular diameter to said horizon bar, a plurality of fixed reference marks on said first masking member, said fixed reference marks cooperating with said bank reference mark to indicate degree of bank, a second masking member affixed between said front supporting member and said first masking member such that a spaced relationship between said first and second masking members is maintained, a pitch indicator bar mounted in front of said disk member, further fixed reference marks cooperating with said pitch indicator bar to indicate degree of pitch and including a zero pitch indicating reference mark, said pitch indicator bar adapted to display up and down pitch attitudes by vertical displacements respectively above and below said zero pitch indicating reference mark and adjacent to said second masking member, said pitch indicator bar having one free end and one end connected at right angles to a pitch pivot arm, a glide-slope pointer fixed at right angles to a glide-slope pivot arm, said pointer being adapted for vertical displacement above and below said zero pitch indicating reference mark in response to corresponding glide-slope position with respect to said aircraft, the extremity of said pointer describing a displacement path adjacent to that described by the free end of said pitch indicator bar, a steering indicator needle, said needle positioned in front of said horizon bar and glide-slope pointer and pivotally supported about an axis perpendicular to and at the bottom of said front supporting member, activating means responsive to signals indicative of roll attitude connected to said horizon disk to rotate said disk about its axis, activating means responsive to glide-slope displacement connected to said glide-slope pivot arm, activating means responsive to pitch attitude connected to said pitch pivot arm, and activating means responsive to steering command signals connected to said steering pointer, whereby the steering needle position is a bank command indication, the glide-slope pointer indicates position of the glide path with respect to the center of said horizon indicating disk member, and displacement of said glide-slope pointer is a pitch command indication.

References Cited in the file of this patent

UNITED STATES PATENTS

| | | |
|---|---|---|
| 2,567,212 | Klopp | Sept. 11, 1951 |
| 2,613,352 | Kellogg | Oct. 7, 1952 |
| 2,696,597 | Chombard | Dec. 7, 1954 |
| 2,732,550 | Reedy | Jan. 24, 1956 |
| 2,737,640 | Barnaby | Mar. 6, 1956 |
| 2,782,395 | Hammond | Feb. 19, 1957 |
| 2,796,594 | Chombard | June 18, 1957 |
| 2,823,378 | Reedy et al. | Feb. 11, 1958 |